United States Patent
Yoshida et al.

(10) Patent No.: US 9,713,964 B2
(45) Date of Patent: Jul. 25, 2017

(54) OUTPUT CONTROLLER FOR FUEL CELL

(75) Inventors: Michio Yoshida, Nishikamo-gun (JP); Atsushi Imai, Gamagori (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1254 days.

(21) Appl. No.: 12/739,120

(22) PCT Filed: Sep. 29, 2008

(86) PCT No.: PCT/JP2008/067619
§ 371 (c)(1),
(2), (4) Date: Apr. 21, 2010

(87) PCT Pub. No.: WO2009/054230
PCT Pub. Date: Apr. 30, 2009

(65) Prior Publication Data
US 2010/0235031 A1    Sep. 16, 2010

(30) Foreign Application Priority Data

Oct. 22, 2007 (JP) .................................. 2007-273439

(51) Int. Cl.
*B60L 11/18*    (2006.01)
*H01M 8/04223*    (2016.01)
(Continued)

(52) U.S. Cl.
CPC ....... *B60L 11/1885* (2013.01); *B60L 11/1892* (2013.01); *B60L 11/1894* (2013.01);
(Continued)

(58) Field of Classification Search
CPC .............. B60L 11/1885; B60L 11/1894; B60L 11/1892; B60L 2250/26; B60L 2240/421;
(Continued)

(56) References Cited

U.S. PATENT DOCUMENTS

| 2004/0074681 A1* | 4/2004 | Ono et al. ..................... 180/65.1 |
| 2006/0055349 A1* | 3/2006 | Nakayama et al. .......... 318/254 |

(Continued)

FOREIGN PATENT DOCUMENTS

| DE | 10233821 | 2/2004 |
| JP | 2000-013914 A | 1/2000 |

(Continued)

OTHER PUBLICATIONS

Cited in German Office Action issued Nov. 16, 2012 (English translation attached).

*Primary Examiner* — H Rojas
(74) *Attorney, Agent, or Firm* — Andrews Kurth Kenyon LLP

(57) ABSTRACT

In a drive control system for a fuel cell-equipped vehicle including a rotating electrical machine, a control unit includes a rapid warm-up processing module for performing rapid warm-up by the low-efficiency power generation of a fuel cell, a torque command value limiting module 68 for limiting the torque command value in accordance with the change of a system voltage caused by rapid warm-up processing, and an FC output command value calculating module for calculating the output command value of the fuel cell in accordance with the limited torque command value. In a storage device connected to the control unit, a system voltage characteristic map which shows the torque-rotation speed characteristics of the rotating electrical machine corresponding to the system voltage is stored.

1 Claim, 3 Drawing Sheets

(51) Int. Cl.
*H01M 8/04537* (2016.01)
*H01M 8/04858* (2016.01)
*H01M 8/04828* (2016.01)
*H01M 8/04992* (2016.01)
*H01M 16/00* (2006.01)

(52) U.S. Cl.
CPC ....... *H01M 8/0488* (2013.01); *H01M 8/0494* (2013.01); *H01M 8/04268* (2013.01); *H01M 8/04544* (2013.01); *H01M 8/04559* (2013.01); *H01M 8/04992* (2013.01); *H01M 16/006* (2013.01); *B60L 2240/421* (2013.01); *B60L 2240/423* (2013.01); *B60L 2250/26* (2013.01); *H01M 2250/20* (2013.01); *Y02T 10/642* (2013.01); *Y02T 90/32* (2013.01); *Y02T 90/34* (2013.01)

(58) Field of Classification Search
CPC .......... B60L 2240/423; H01M 8/0494; H01M 16/006; H01M 8/04992; H01M 8/0488; H01M 8/04268; H01M 8/04544; H01M 8/04559; H01M 2250/20; Y02E 60/50; Y02T 10/642; Y02T 90/32; Y02T 90/34
See application file for complete search history.

(56) References Cited

U.S. PATENT DOCUMENTS

2006/0102397 A1\* 5/2006 Buck et al. .................. 180/65.3
2006/0278450 A1\* 12/2006 Shirasaka et al. ........... 180/65.3

FOREIGN PATENT DOCUMENTS

| JP | 2002313388 | 10/2002 |
| JP | 2003-036873 A | 2/2003 |
| JP | 2005-057929 A | 3/2005 |
| JP | 2006-345651 A | 12/2006 |
| JP | 2007-020244 A | 1/2007 |
| JP | 2007-109469 A | 4/2007 |
| JP | 2007-157478 A | 6/2007 |

\* cited by examiner

OUTPUT CONTROLLER FOR FUEL CELL

This is a 371 national phase application of PCT/JP2008/067619 filed 29 Sep. 2008, claiming priority to Japanese Patent Application No JP 2007-273439 filed 22 Oct. 2007, the contents of which are incorporated herein by reference.

TECHNICAL FIELD

The present invention relates to an output controller for a fuel cell. More particularly, the invention relates to an output controller for a fuel cell which performs output control of a fuel cell connected to a driving circuit of a rotating electrical machine.

BACKGROUND ART

From the viewpoint that a fuel cell scarcely influences the environment, a vehicle is equipped with the fuel cell. The fuel cell is nota secondary battery, and hence, in order to cope with fluctuation of a load or the like, the fuel cell is usually used in combination with a high-voltage accumulator. The performance of this high-voltage accumulator is known to deteriorate owing to overdischarge or overcharge. In consequence, in order to maintain the performance of the high-voltage accumulator, it is important that the power generation of the fuel cell be brought into an appropriate state in accordance with the situation of the load.

It is disclosed in, for example, Patent Document 1 that when the temperature of the fuel cell lowers in a controller for a fuel cell vehicle, maximum output power tends to decrease, and when the rotation speed of a motor is relatively low, the output of the motor is highly likely to increase rapidly, thereby heightening a possibility of a rapid drop in a system voltage supplied to a PCU under these conditions. Here, it is also disclosed that a driving demand output in response to a torque command is obtained from the rotation speed of the motor and the opening degree of an accelerator, and a motor output limiting start voltage and a motor output limiting end voltage are limited by the temperature of the fuel cell and the rotation speed of the motor, thereby preventing an excess drop in the system voltage. Here, the system voltage is an input voltage to a driving circuit of the motor serving as the load, and is also an output voltage from the fuel cell.

Patent Document 1: JP-A-2006-345651

DISCLOSURE OF THE INVENTION

Problem to be Solved by the Invention

As disclosed in Patent Document 1, an output command value to a fuel cell is calculated from the torque-rotation speed characteristics of a rotating electrical machine at a rated voltage on the basis of a torque command value indicated by an accelerator opening degree and the like. That is, the output command value to the fuel cell is calculated so as to cover a power consumed by the rotating electrical machine at the rated voltage. In this case, the rated voltage is the driving voltage of the rotating electrical machine; that is, the rated voltage with respect to a system voltage in Patent Document 1. The rated voltage is used as a reference value for performing operation control in the rotating electrical machine, a fuel cell system, and a driving system equipped with the fuel cell system or the like, and various settings are performed on the basis of the rated voltage.

Meanwhile, when the system voltage is lower than the rated voltage, the driving voltage of the rotating electrical machine becomes lower than the rated voltage. In this case, the output command value to the fuel cell is calculated on the basis of the rated voltage, and hence the generated power of the fuel cell becomes excessively larger than the power consumed by the rotating electrical machine serving as a load. Conversely, when the system voltage is higher than the rated voltage, the generated power of the fuel cell falls short of covering the power consumed by the rotating electrical machine serving as the load. Thus, when the system voltage for the driving circuit of the rotating electrical machine deviates from the rated voltage, the power generation of the fuel cell might deviate from an appropriate state.

An object of the present invention is to provide a fuel cell output controller capable of bringing the power generation of a fuel cell into an appropriate state in accordance with a system voltage for a driving circuit of a rotating electrical machine.

Means for Solving the Problem

An output controller for a fuel cell according to the present invention is characterized by comprising: a torque limiting unit for limiting the torque command value of a rotating electrical machine on the basis of a system voltage value which is an input voltage value to a driving circuit of the rotating electrical machine connected to the fuel cell; and a unit for calculating an output command value to the fuel cell in accordance with the power consumption value of the rotating electrical machine obtained on the basis of the limited torque command value and the rotation speed of the rotating electrical machine.

Moreover, in the output controller for the fuel cell according to the present invention, the torque limiting unit preferably limits the torque command value of the rotating electrical machine on the basis of a relation between the rotation speed and the torque of the rotating electrical machine which changes in accordance with the system voltage value.

Furthermore, in the output controller for the fuel cell according to the present invention, the torque limiting unit preferably limits the torque command value of the rotating electrical machine when the system voltage value is lowered to perform low-efficiency power generation processing, so as to be lower than a torque command value of the rotating electrical machine when usual power generation processing is performed.

Effect of the Invention

According to the above constitution, the output controller for the fuel cell limits the torque command value of the rotating electrical machine on the basis of the system voltage value, and calculates the output command value to the fuel cell in accordance with the power consumption value of the rotating electrical machine obtained on the basis of the limited torque command value and the rotation speed of the rotating electrical machine. Thus, the output command value of the fuel cell is set in accordance with the system voltage value, and hence the fuel cell can appropriately generate power.

Moreover, the output controller for the fuel cell limits the torque command value of the rotating electrical machine on the basis of the relation between the rotation speed and the torque of the rotating electrical machine, which changes in accordance with the system voltage value. For example, in the rotating electrical machine of a synchronous type, the relation between the rotation speed and the torque changes in accordance with the system voltage. In such a rotating electrical machine, the torque command value is limited on the basis of the characteristics thereof which change in accordance with the system voltage, and the output command value of the fuel cell is calculated on the basis of the limited torque command value. Therefore, the power generation of the fuel cell can be brought into an appropriate state in accordance with the system voltage.

Furthermore, the output controller for the fuel cell limits the torque command value of the rotating electrical machine when the system voltage value is lowered to perform the low-efficiency power generation processing, so as to be lower than a torque command value of the rotating electrical machine when the usual power generation processing is performed. For example, when the fuel cell has a low temperature, in order to accelerate temperature rise, at times, the power generation is performed within a range which deviates from the operation conditions of the fuel cell for obtaining optimum efficiency. This is called warm-up processing by the low-efficiency power generation, and, for example, the output voltage of the fuel cell can be lowered to perform the low-efficiency power generation. In this case, the system voltage is lowered, and hence the torque command value is limited to a lower value in accordance with the system voltage, whereby the power generation of the fuel cell can be set to an appropriate amount.

DESCRIPTION OF REFERENCE NUMERALS

Figure 1:
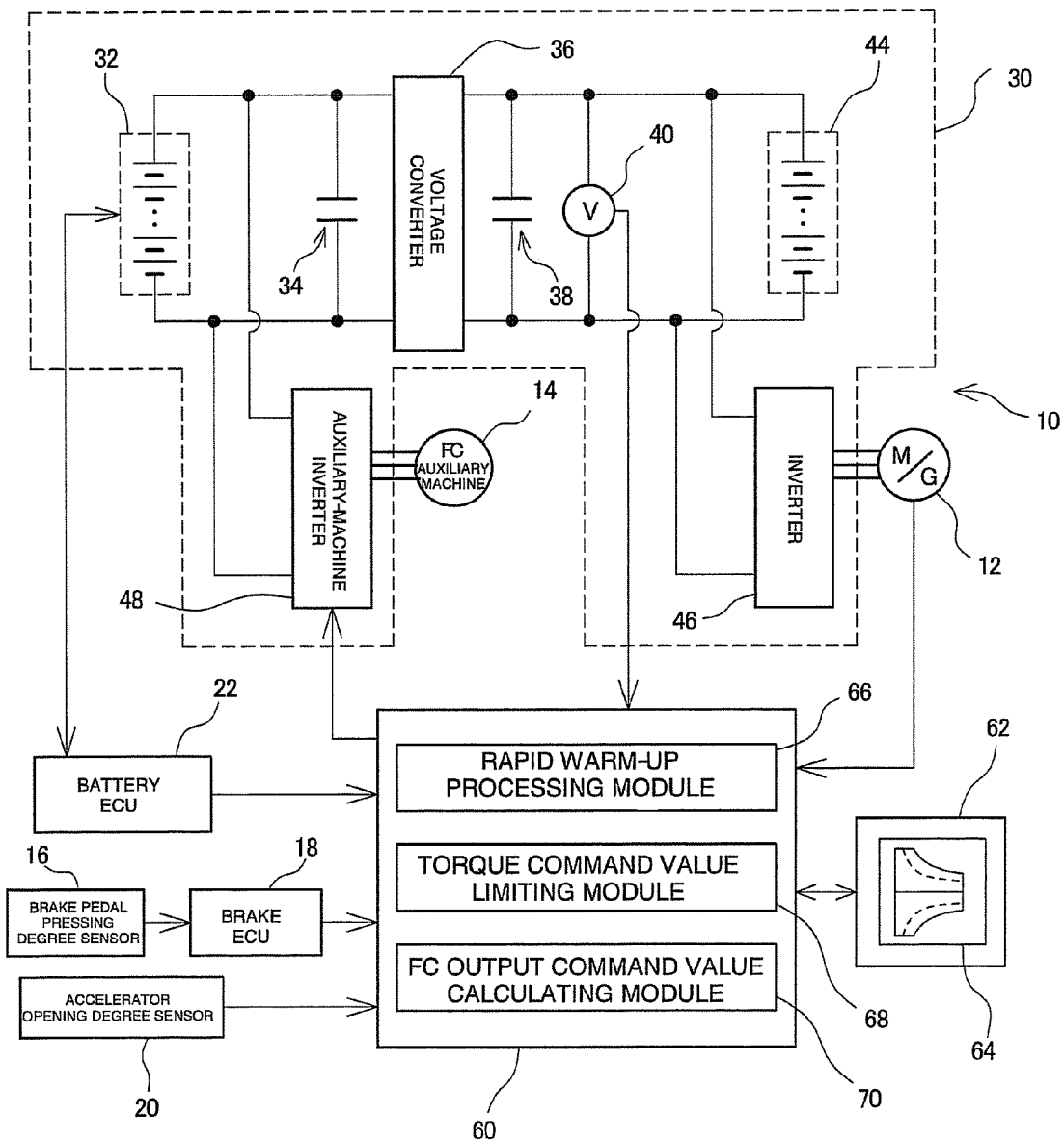
FIG. 1 is a diagram showing the constitution of a drive control system for a fuel-cell-equipped vehicle including a rotating electrical machine in an embodiment according to the present invention.

10: drive control system, 12: rotating electrical machine, 14: FC auxiliary machine, 16: brake pedal pressing degree sensor, 18: brake ECU, 20: accelerator opening degree sensor, 22: battery ECU, 30: power source circuit, 32: accumulator, 34, 38: smoothing capacitor, 36: voltage converter, 40: voltage detector, 44: fuel cell, 46: M/G inverter, 48: auxiliary-machine inverter, 60: control unit, 62: storage device, 64: system voltage characteristic map, 66: rapid warm-up processing module, 68: torque command value limiting module, 70: FC output command value calculating module, 80, 84: power running characteristic, and 82, 86: regenerative characteristic.

BEST MODE FOR CARRYING OUT THE INVENTION

Hereinafter, an embodiment according to the present invention will be described in detail with reference to the drawing. In the following, a constitution where a rotating electrical machine is mounted in a vehicle will be described, but the rotating electrical machine for an application other than the vehicle may be used, and, for example, a stationary-type rotating electrical machine is also usable. Moreover, a fuel-cell-equipped vehicle including one rotating electrical machine will hereinafter be described, but a plurality of rotating electrical machines may be included. Furthermore, as the rotating electrical machine, a motor generator having the functions of a motor and a power generator will be described, but the rotating electrical machine may have the function of the motor only, and the vehicle may have the motor and the power generator individually.

Moreover, there will hereinafter be described in detail a case where rapid warm-up by the low-efficiency power generation of a fuel cell is performed in order to limit the torque of the rotating electrical machine on the basis of a system voltage, but this is one example for explanation. The present invention can also be performed in any case where the torque of the rotating electrical machine is limited on the basis of the system voltage. For example, the present invention can also be practiced in a case where the system voltage is limited in accordance with vehicle running conditions or the environmental situation of the vehicle. Furthermore, as a power source circuit, there will hereinafter be described a constitution including a high-voltage accumulator, a fuel cell, a voltage converter, and an inverter which operates at a high voltage, but the constitution may include other elements; for example, a system main relay, a low-voltage battery, and a DC/DC converter which operates at a low voltage.

FIG. 1 is a diagram showing the constitution of a drive control system 10 for a fuel-cell-equipped vehicle including a rotating electrical machine. In particular, here reference will be made to the output control of a fuel cell which is performed to cope with the change in the system voltage caused by rapid warm-up processing by the low-efficiency power generation of the fuel cell.

The drive control system 10 is constituted of a power source circuit 30 including a fuel cell 44 and an accumulator 32 which functions a secondary battery; a rotating electrical machine 12 and an auxiliary machine for the fuel cell 14 (an FC auxiliary machine 14) connected to this circuit; a brake pedal pressing degree sensor 16 and a brake electric control unit 18 (brake ECU 18) for determining the driving demand of the vehicle; an accelerator opening degree sensor 20; a battery ECU 22 for controlling the charge/discharge of the accumulator 32; a control unit 60; and a storage device 62 connected to the control unit 60.

The rotating electrical machine 12 is a motor generator (M/G) mounted in the vehicle, and is a three-phase synchronous type rotating electrical machine which functions as a motor when the power is supplied thereto and functions as a power generator during braking. The rotation speed of the rotating electrical machine 12 is detected by appropriate detection means, and the detected value is transmitted to the control unit 60.

The FC auxiliary machine 14 is an auxiliary machine used for the fuel cell 44, and examples of the auxiliary machine include an air compressor (ACP) provided in an oxidizing gas passage, a hydrogen pump provided in a fuel gas passage, and a cooling pump for the fuel cell. The FC auxiliary machine 14 receives a high-voltage power of, for example, about 200 V, whereby it operates. It is to be noted that FC is an abbreviation for fuel cell, which indicates the fuel cell 44. Hereinafter, the fuel cell 44 is referred to as the FC, if necessary.

The power source circuit 30 is a circuit connected to the rotating electrical machine 12, which is the motor generator, and the FC auxiliary machine 14. When the rotating electrical machine 12 functions as a driving motor, the circuit supplies the power to this motor. Alternatively, when the rotating electrical machine 12 functions as the power generator, the circuit has a function of receiving a regenerative power to charge the accumulator 32, which is the secondary battery. Moreover, the circuit has a function of supplying the high-voltage power necessary for the FC auxiliary machine 14.

The power source circuit 30 is constituted of the accumulator 32, which is the secondary battery; a smoothing capacitor 34 on the side of the accumulator; a voltage converter 36; a smoothing capacitor 38 on the side of the fuel cell; the fuel cell 44; an M/G inverter 46 connected to the rotating electrical machine 12; and an auxiliary-machine inverter 48 connected to the FC auxiliary machine 14.

The accumulator 32 is a chargeable/dischargeable high-voltage secondary battery, and has a function of sharing the power between the accumulator and the fuel cell 44 via the voltage converter 36 to cope with fluctuations of loads of the rotating electrical machine 12 and the FC auxiliary machine 14 and the like. As the accumulator 32, for example, a lithium ion combination battery or a nickel hydrogen combination battery having a terminal voltage of about 200 V to about 300 V, a capacitor, or the like can be used. It is to be noted that the accumulator 32 is a so-called high-voltage battery, and when the word "battery" is simply mentioned, it frequently indicates the accumulator 32. Therefore, the accumulator 32 will hereinafter be referred to as the battery, if necessary.

The voltage converter 36 is a circuit having a function of sharing the power between a high voltage on the side of the accumulator 32 and a high voltage on the side of the fuel cell 44. For example, when the accumulator 32 assists the driving of the rotating electrical machine 12, the high-voltage power is supplied from the accumulator 32 side to the fuel cell 44 side while converting the voltage. Conversely, when the accumulator 32 is charged, the high-voltage power is supplied from the fuel cell 44 side to the accumulator 32 side while converting the voltage. As the voltage converter 36, a bidirectional converter including a reactor can be used.

The smoothing capacitors are provided on respective sides of the voltage converter 36. That is, the smoothing capacitor 34 on the side of the accumulator 32 is provided between a positive electrode side bus and a negative electrode side bus for connecting the voltage converter 36 to the accumulator 32, and the smoothing capacitor 38 on the side of the fuel cell 44 is provided between the positive electrode side bus and the negative electrode side bus for connecting the voltage converter 36 to the fuel cell 44.

The fuel cell 44 is a kind of combination battery having a constitution in which a plurality of fuel cells are combined so that the generated power having a high voltage of about 200 V to about 300 V can be taken out, and the fuel cell is referred to as a fuel cell stack. Here, each fuel cell has functions of feeding hydrogen as a fuel gas to an anode side, feeding air as an oxidizing gas to a cathode side, and taking out the necessary power by a cell chemical reaction through an electrolyte film, which is a solid polymer film. To operate the fuel cell 44, the FC auxiliary machine 14 must be operated.

A voltage detector 40 is provided between the positive electrode side bus and the negative electrode side bus for connecting the fuel cell 44 to the voltage converter 36, and has a function of detecting the output voltage value of the fuel cell 44. The output voltage value of the fuel cell 44 is an input voltage value to the M/G inverter 46 connected to the rotating electrical machine 12, and hence the voltage detector 40 detects a so-called system voltage value. The detected system voltage value is transmitted to the control unit 60 through an appropriate signal line.

The M/G inverter 46 is a circuit having a function of converting high-voltage direct-current power into alternating-current three-phase driving power under the control of the control unit 60 to supply the power to the rotating electrical machine 12, and a function of conversely converting alternating-current three-phase regenerative power from the rotating electrical machine 12 into high-voltage direct-current charge power. The M/G inverter 46 can be constituted of a circuit including a switching element, a diode, and the like.

The auxiliary-machine inverter 48 has a function of converting the high-voltage direct-current power into the alternating-current three-phase driving power under the control of the control unit 60 to supply the power to the FC auxiliary machine 14. This constitution of the auxiliary-machine inverter 48 is basically similar to that of the M/G inverter 46.

Next, elements connected to the control unit 60 will be described. The brake pedal pressing degree sensor 16 is a sensor which detects the operation amount of a brake pedal or the like. Here, the brake ECU 18 has a function of receiving the detected value of the brake pedal pressing degree sensor 16, and converting the value into a braking demand torque for the rotating electrical machine 12 to input the converted torque into the control unit 60. The accelerator opening degree sensor 20 has a function of detecting the operation amount of an accelerator pedal or the like, and converting the detected amount into a driving demand torque for the rotating electrical machine 12 to input the converted torque into the control unit 60. That is, the brake pedal pressing degree sensor 16 and the accelerator opening degree sensor 20 are a device which are operated by a user and indicate a demand torque for the rotating electrical machine 12.

The battery ECU 22 is a controller having a function of detecting the state of the accumulator 32, which is the high-voltage battery, and controlling and optimizing the charge/discharge state thereof. Examples of the state of the accumulator 32 to be monitored include an output voltage, an input/output current, a temperature, and a state of charge (SOC), and the values of the state are transmitted to the control unit 60, if necessary.

The storage device 62 connected to the control unit 60 has a function of storing a program or the like to be executed by the control unit 60. In particular, here, the storage device has a function of storing the characteristics of the rotating electrical machine 12; that is, a system voltage characteristic map 64 showing torque-rotation speed characteristics in relation to the system voltage.

Figure 2:
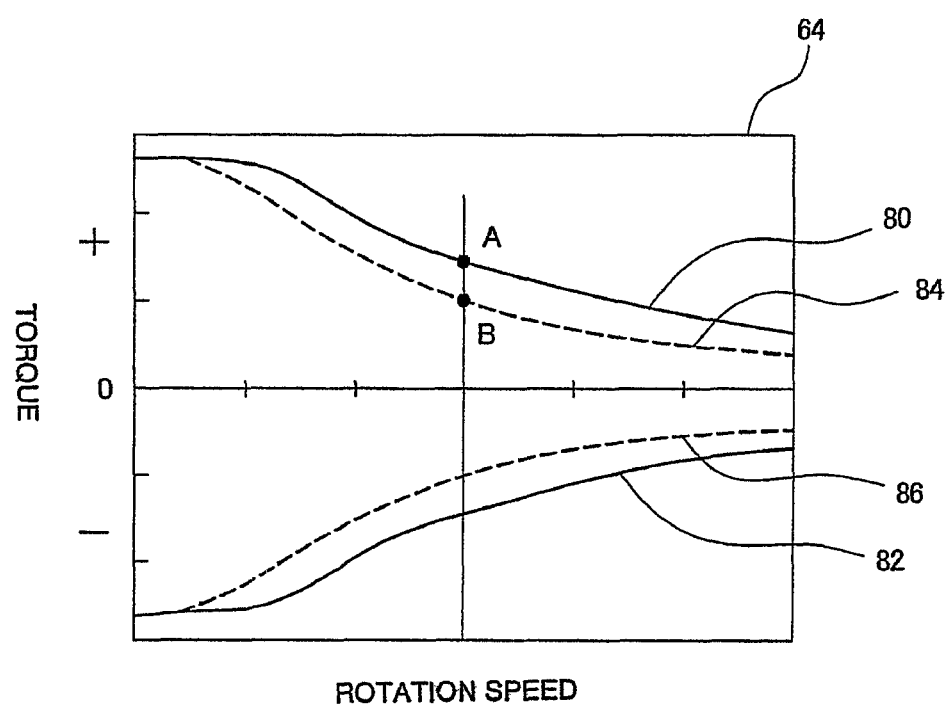
FIG. 2 is a diagram showing an example of a system voltage characteristic map in the embodiment according to the present invention.

An example of the system voltage characteristic map 64 is shown in FIG. 2. Hereinafter, description will be made by use of the reference numerals of FIG. 1. The system voltage characteristic map 64 is a diagram showing the dependence of the torque-rotation speed characteristics of the rotating electrical machine 12 on the system voltage. In FIG. 2, the abscissa indicates the rotation speed of the rotating electrical machine 12, the ordinate indicates the torque of the rotating electrical machine 12 around an output axis thereof, and the so-called torque-rotation speed characteristics of the rotating electrical machine 12 are shown. The solid lines in FIG. 2 indicate how the torque changes with respect to the rotation speed, when the system voltage is a rated voltage and an accelerator opening degree is 100%. Here, the rotating electrical machine 12 is a member to be mounted in the vehicle. Therefore, when the torque is positive, a power running characteristic 80 for driving the drive wheels of the vehicle is taken, and when the torque is negative, a regenerative characteristic 82 in a braked state of the vehicle is taken.

One example of the rated voltage value of the system voltage will be described. In the above example, the voltage of the fuel cell 44 is within a range of about 200 V to about 300 V, and hence it can be set to, for example, about 240 V. Here, when the fuel cell 44 has a low temperature, in order to rapidly raise the temperature, the power is generated under conditions which deviate from the optimum operation conditions of the fuel cell 44. For example, the output voltage of the fuel cell 44 is set to a voltage lower than the optimum conditions, and the efficiency of the power generation is lowered so that the resultant balance is utilized for the heat generation. In the case of the rapid warm-up by such low-efficiency power generation, the output voltage of the fuel cell 44 is set to a low value, and hence the system voltage is also low. For example, in the low-efficiency power generation, the system voltage is about 180 V.

The rotating electrical machine 12 is of a three-phase synchronous type, and hence the torque changes to a larger or smaller value at the same rotation speed in accordance with the value of the driving voltage, which is the system voltage. The broken lines in FIG. 2 show how the torque changes with respect to the rotation speed, when the system voltage is a voltage lower than the rated voltage and the accelerator opening degree is 100%. For example, a case where the driving voltage which is the system voltage is about 180 V is shown. It is to be noted that in the same manner as in the case of the solid lines, when the torque is positive, a power running characteristic 84 for driving the drive wheels of the vehicle is taken, and when the torque is negative, a regenerative characteristic 86 in the braked state of the vehicle is taken.

In FIG. 2, when a line shown at a certain rotation speed is used and attention is paid to the torque at the rotation speed, in the case of the solid line where the system voltage is a rated voltage of about 240 V, the torque has a value of a point A. On the other hand, in the case of the broken line at the rapid warm-up by the low-efficiency power generation at a system voltage of about 180 V, the torque has a value of a point B, which is lower than the value of the point A. In the rotating electrical machine 12, when the system voltage lowers from about 240 V to about 180 V under the condition of the same rotation speed, the torque lowers from the value of the point A to the value of the point B.

In other words, when the system voltage lowers from the rated voltage to the voltage of the low-efficiency power generation under the condition of the same rotation speed, the power consumption value of the rotating electrical machine 12 lowers to B/A. Here, when the output command value to the fuel cell 44; that is, a power generation command value, is maintained and the power consumed by the rotating electrical machine 12 lowers to B/A, the power remains unconsumed in an amount of as much as (A−B)×the rotation speed. Consequently, in this case, the fuel cell 44 generates excessive power, surplus power is transmitted to the accumulator 32, and the accumulator 32 is overcharged as the case may be. To prevent this problem, the output command value to the fuel cell 44; that is, the FC output command value, has to be changed in accordance with the changes in the characteristics of FIG. 2. That is, the system voltage characteristic map 64 of FIG. 2 is used for the change of the FC output command value.

Returning to FIG. 1, the storage device 62 stores the system voltage characteristic map 64 of FIG. 2. As described above, the system voltage characteristic map 64 shows the torque-rotation speed characteristics, which change in accordance with the system voltage. Therefore, instead of the form of the map, the torque characteristics can be stored in such a form as to read the torque by using the system voltage and the rotation speed as retrieval keys. For example, the torque characteristics can be stored in the form of a conversion table in which the system voltage and the rotation speed are input to output the torque value, the form of a calculation formula, or the like.

The control unit 60 has a function of controlling all of the elements of the drive control system 10, but here especially, it has a function of changing the output command value of the fuel cell 44 in accordance with the change of the system voltage. Here, the control unit 60 corresponds to an output controller for the fuel cell in the drive control system 10 of the vehicle. The control unit 60 is constituted of a rapid warm-up processing module 66 for performing the rapid warm-up by the low-efficiency power generation of the fuel cell 44, a torque command value limiting module 68 for limiting the torque command value in accordance with the change of the system voltage caused by the rapid warm-up processing, and an FC output command value calculating module 70 for calculating the output command value of the fuel cell in accordance with the limited torque command value.

The control unit 60 can be constituted of a computer which is suitable for mounting in the vehicle. The control unit 60 can be constituted of the single computer, but when there are additionally present an ECU and the like which are to be mounted in the vehicle, the functions of the control unit 60 can be utilized as a part of the functions of the ECU and the like mounted in the vehicle. The respective functions of the control unit 60 can be realized by software, and, for example, they can be realized by executing a corresponding fuel cell output control program.

Figure 3:
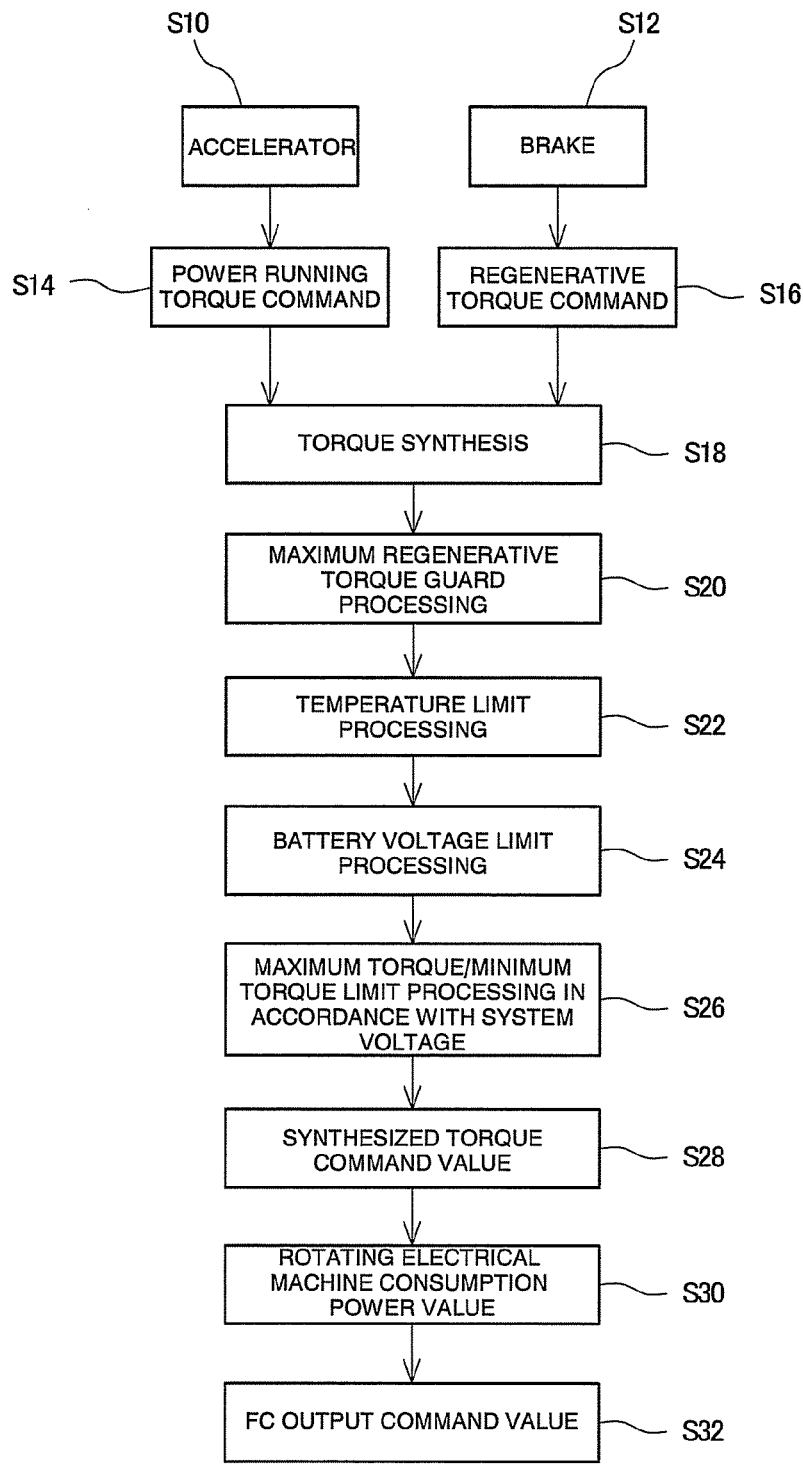
FIG. 3 is a block diagram showing the functions of a control unit in the embodiment according to the present invention.

The operation of the above constitution, especially the respective functions of the control unit 60, will be described in more detail with reference to FIG. 3. Hereinafter, they will be described by using the reference numerals of FIGS. 1 and 2. FIG. 3 corresponds to a block diagram showing the functions of the control unit 60, but here, the above functions will be described in accordance with procedures to be executed by the control unit 60. Therefore, the procedures correspond to the processing procedures of the corresponding fuel cell output control program, respectively.

The fuel cell output control program is started, and a judgment is made as to whether or not the fuel cell 44 satisfies predetermined rapid warm-up processing execution conditions. This judgment can be performed, for example, by comparing the temperature of the fuel cell 44 with the temperature of fuel cell cooling water or outside air with a predetermined threshold temperature. When it is judged that rapid warm-up processing execution conditions are satisfied, a command for advancing the power generation under low-efficiency power generation conditions is issued to the fuel cell 44. This procedure is executed by the function of the rapid warm-up processing module 66 of the control unit 60.

In consequence, as described with reference to FIG. 2, the output voltage of the fuel cell 44 is set to a predetermined low voltage, whereby the system voltage is a voltage lower than the rated voltage. In the above example, the system voltage lowers from the rated voltage of about 240 V to about 180 V. It is to be noted that when usual power generation and the low-efficiency power generation are switched in this manner, the torque limiting value is preferably subjected to rate limit processing to thereby suppress the deterioration of drivability.

Next, the steps shown in FIG. 3 are executed. First, a power running torque command and a regenerative torque command demanded by the user are calculated on the basis of the accelerator opening degree and the brake pedal pressing degree, respectively (S10, S12, S14, and S16), and the obtained values are added up to calculate a demand torque in the form of torque synthesis (S18). The power running torque command is calculated by converting the accelerator opening degree based on the detected value of the accelerator opening degree sensor 20, and the regenerative torque command is calculated by converting the detected value of the brake pedal pressing degree sensor 16 into the torque with the brake ECU 18.

The value obtained by the torque synthesis is subjected to the guard processing of a maximum regenerative torque (S20). Here, processing similar to S16 is performed, but the calculation of S18 is additionally performed, and hence limit processing is executed again for confirmation. Next, torque limit processing by the temperature of the rotating electrical machine 12 or the M/G inverter 46 is performed (S22). Then, the torque limit processing by the output voltage of the high-voltage accumulator 32 is performed (S24). Thus, the torque-rotation speed characteristics in conditions including the opening degree of the accelerator pedal operated by the user and the like are obtained. Up to this step, the calculation can be performed under, for example, the rated voltage.

Next, the system voltage is detected, and the limit processing of maximum and minimum torques in accordance with the system voltage is performed (S26). This step is executed by reading the system voltage characteristic map 64 from the storage device 62 by the function of the torque command value limiting module 68 of the control unit 60. Specifically, the maximum torque and the minimum torque are read from the system voltage characteristic map 64 by use, as retrieval keys, of the system voltage detected by the voltage detector 40 and the rotation speed transmitted from the rotating electrical machine 12.

Here, the maximum torque is the torque during power running; that is, the case where the torque is positive, and the minimum torque is the torque during regeneration; that is, the case where the torque is negative. Therefore, the maximum torque and the minimum torque at the system voltage mean the power running characteristic 80 or 84 in the case where the torque is positive and the regenerative characteristic 82 or 86 in the case where the torque is negative in the torque-rotation speed characteristics of FIG. 2, respectively. In the above example, when the system voltage is the rated voltage, the upper limit of the maximum torque is limited by the power running characteristic 80, and the lower limit of the minimum characteristic is limited by the regenerative characteristic 82. Moreover, when the system voltage is about 180 V, the upper limit of the maximum torque is limited by the power running characteristic 84, and the lower limit of the minimum characteristic is limited by the regenerative characteristic 86.

When the limit processing of the torque at the system voltage; that is, the limit processing of the torque command value, is performed in this manner, the limited power running torque command and the limited regenerative torque command are added up to obtain a synthesized torque command value (S28). For example, when the brake pedal pressing degree is zero and the accelerator opening degree is 100% and the system voltage is about 180 V, the synthesized torque command value corresponds to the value of the point B as described in FIG. 2. This synthesized torque command value is multiplied by the rotation speed of the rotating electrical machine 12 to obtain the power consumption of the rotating electrical machine 12 (S30). Then, as a value corresponding to this power consumption, the power generation command value of the fuel cell 44; that is, the FC output command value, is calculated (S32). The calculated FC output command value is indicated to the auxiliary-machine inverter 48, and the FC auxiliary machine 14 is driven to cause the fuel cell 44 to generate the power in accordance with the command value.

Thus, the FC output command value is calculated in accordance with the system voltage, and hence the fuel cell 44 can appropriately generate the power.

INDUSTRIAL APPLICABILITY

The drive control system 10 of the present invention can be used in an application in which the torque of a rotating electrical machine is limited on the basis of a system voltage, and can also be used in, for example, a vehicle on which the rotating electrical machine (a power generator or an electric motor) is mounted, or a rotating electrical machine used on an apparatus other than the vehicle, such as a stationary-type rotating electrical machine.

The invention claimed is:

1. An output controller for a fuel cell for performing an output control of the fuel cell connected to a driving circuit of a rotating electrical machine functioning as an electric motor and a power generator, the output controller for the fuel cell comprising a computer that is programmed to:
   calculate a power generation command value for the fuel cell based on a consumption power of the rotating electrical machine when a system voltage is set at a rated voltage, the system voltage being an output voltage of the fuel cell and an input voltage to the driving circuit of the rotating electrical machine;
   set, when a temperature of the fuel cell satisfies a predefined execution condition for a rapid warm-up process, the system voltage to a voltage lower than an optimum operation voltage of the fuel cell in order to execute the rapid warm-up process, such that the system voltage is set to a predetermined voltage lower than the rated voltage;
   read, from a system voltage characteristic map indicating a relationship between a rotation speed and a maximum torque and a minimum torque of the rotating electrical machine as a function of the system voltage, a maximum torque and a minimum torque corresponding to a rotation speed N of the rotating electrical machine under the system voltage being set at the predetermined voltage lower than the rated voltage in order to change a torque command value of the rotating electrical machine from a value corresponding to the rated voltage to a limited torque command value T; and
   calculate, from the limited torque command value T and the rotation speed N of the rotating electrical machine N, a consumption power (T×N) of the rotating electrical machine under the rapid warm-up process, and calculate a power generation command value to the fuel cell under the rapid warm-up process based on the calculated consumption power in order to update the power generation command value calculated with the system voltage set at the rated voltage.

* * * * *